United States Patent
Kolbe et al.

(10) Patent No.: US 11,153,369 B2
(45) Date of Patent: Oct. 19, 2021

(54) OPERATION OF A TELECOMMUNICATIONS NETWORK BEING OPERATED AS A MULTI-OPERATOR SLICED NETWORK

(71) Applicant: DEUTSCHE TELEKOM AG, Bonn (DE)

(72) Inventors: Hans-Joerg Kolbe, Darmstadt (DE); Thomas Haag, Rodgau (DE); Wolfgang Hurst, Langen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/982,651

(22) PCT Filed: Mar. 22, 2019

(86) PCT No.: PCT/EP2019/057326
§ 371 (c)(1),
(2) Date: Sep. 21, 2020

(87) PCT Pub. No.: WO2019/180248
PCT Pub. Date: Sep. 26, 2019

(65) Prior Publication Data
US 2021/0029195 A1    Jan. 28, 2021

(30) Foreign Application Priority Data
Mar. 23, 2018 (EP) .................................. 18163645

(51) Int. Cl.
*H04L 29/08* (2006.01)
*H04L 29/12* (2006.01)
*H04L 29/06* (2006.01)

(52) U.S. Cl.
CPC .......... *H04L 67/10* (2013.01); *H04L 61/1511* (2013.01); *H04L 61/2007* (2013.01); *H04L 63/0815* (2013.01)

(58) Field of Classification Search
CPC . H04L 67/10; H04L 61/1511; H04L 61/2007; H04L 63/0815
See application file for complete search history.

(56) References Cited

U.S. PATENT DOCUMENTS 6,697,864 B1   2/2004  Demirtjis et al.
6,704,303 B1 * 3/2004  Bowman-Amuah ....................... H04L 12/6418
                                                                 370/352

(Continued)

FOREIGN PATENT DOCUMENTS

WO   WO 2011160813 A1    12/2011

*Primary Examiner* — Christopher B Robinson
(74) *Attorney, Agent, or Firm* — Leydig, Voit & Mayer, Ltd.

(57) ABSTRACT

A method for operation of a telecommunications network with a broadband access network includes: in a first step, a specific network termination node is connected to a specific line termination node and activated, wherein a walled garden access is provided, to the specific network termination node, to access a provider infrastructure control center of the telecommunications network; in a second step, subsequent to the first step, the walled garden access is used, by the specific network termination node or by a client device connected to the specific network termination node, to access a provider-specific server environment of the specific provider; and in a third step, subsequent to the second step, the specific network termination node is authenticated and federated with the specific provider.

10 Claims, 5 Drawing Sheets

(56) References Cited

U.S. PATENT DOCUMENTS

| | | | |
|---|---|---|---|
| 2006/0050862 A1* | 3/2006 | Shen | H04Q 3/0062 |
| | | | 379/219 |
| 2013/0100913 A1* | 4/2013 | Scherer | H04L 63/08 |
| | | | 370/329 |
| 2015/0288578 A1 | 10/2015 | Elford et al. | |
| 2015/0288825 A1* | 10/2015 | Cook | H04M 7/125 |
| | | | 379/220.01 |
| 2020/0296187 A1* | 9/2020 | Sabella | H04L 69/08 |

* cited by examiner

OPERATION OF A TELECOMMUNICATIONS NETWORK BEING OPERATED AS A MULTI-OPERATOR SLICED NETWORK

CROSS-REFERENCE TO PRIOR APPLICATIONS

This application is a U.S. National Phase Application under 35 U.S.C. § 371 of International Application No. PCT/EP2019/057326, filed on Mar. 22, 2019, and claims benefit to European Patent Application No. EP 18163645.7, filed on Mar. 23, 2018. The International Application was published in English on Sep. 26, 2019 as WO 2019/180248 A1 under PCT Article 21(2).

FIELD

The present invention relates a method for improved operation of a telecommunications network with a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node.

Furthermore, the present invention relates to a telecommunications network for improved operation, the telecommunications network having a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node.

Additionally, the present invention relates to a system for improved operation of a telecommunications network with a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node, the system comprising the telecommunications network and a specific provider of the communication service providers.

Furthermore, the present invention relates to a provider infrastructure control center of a telecommunications network or of a system and/or to the use of a provider infrastructure control center in a telecommunications network or in a system or in a method according to the present invention.

Furthermore, the present invention relates to a program comprising a computer readable program code, and a computer-readable medium.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present application generally relates to the area of aggregation networks linking remote or central access nodes to a backbone network or core network of the telecommunications network, e.g. broadband access network platforms such as 5G or CORD (Central Office Re-architected as a Data Center).

Typically in such architectures, multiple network termination ports are aggregated by an access node (e.g. a DSLAM device (Digital Subscriber Line Access Multiplexer) or an OLT (Optical Line Terminal) device) and interconnected to a subscriber termination device via a layer-2 infrastructure such as a datacenter fabric.

In today's broadband networks, an optical network terminal device (or network termination node) needs to be authenticated by an optical line terminal (or line termination node). This typically requires knowledge on device-specific information (basic credentials, usually a serial number) before the optical network terminal device (network termination node) gets connected. In conventionally known networks, the network operator typically owns and provides the optical network terminal device (or network termination nodes) and thus knows the built-in credentials (such as identity information or hardware identity information or serial numbers, etc.) which are typically configured by network operator technicians at time of setup.

SUMMARY

In an exemplary embodiment, the present invention provides a method for operation of a telecommunications network with a broadband access network. The telecommunications network is operated as a multi-operator sliced network and comprises a central office point of delivery and/or a provider infrastructure control center for service activation and/or operation of a network termination node. A plurality of communication service providers are enabled to use infrastructure of the telecommunications network for providing communication services to a plurality of users connected to the telecommunications network using a network termination node. The central office point of delivery and/or the broadband access network comprises a plurality of line termination nodes. A specific line termination node of the plurality of line termination nodes is connectable to a specific network termination node of a plurality of network termination nodes. An authentication of the specific network termination node is performed, after connecting the specific network termination node to the specific line termination node, via a provider federation operation, relating the specific network termination node to a specific provider of the communication service providers. The method comprises: in a first step, the specific network termination node is connected to the specific line termination node and activated, wherein a walled garden access is provided, to the specific network termination node, to access the provider infrastructure control center of the telecommunications network; in a second step, subsequent to the first step, the walled garden access is used, by the specific network termination node or by a client device connected to the specific network termination node, to access a provider-specific server environment of the specific provider; and in a third step, subsequent to the second step, the specific network termination node is authenticated and federated with the specific provider.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

On the one hand, the (regulatory) requirement of free choice of the used PON (passive optical network) or optical network terminals or home gateway devices by the customer needs to be satisfied. Additionally, possibility to enable the sharing of infrastructure among multiple operators is a further requirement.

Exemplary embodiments of the present invention provide a technically simple, effective and cost effective solution for improved operation of a telecommunications network with a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node, wherein the central office point of delivery and/or the broadband access network comprises a plurality of line termination nodes, wherein a specific line termination node of the plurality of line termination nodes is connectable to at least one specific network termination node of a plurality of network termination nodes, wherein an authentication of the specific network termination node is performed, after connecting the specific network termination node to the specific line termination node, via a provider federation operation, relating the specific network termination node to a specific provider of the plurality of communication service providers. Exemplary embodiments of the present invention further provide a corresponding telecommunications network, a corresponding system, a corresponding provider infrastructure control center, and a corresponding network of a service provider.

In an exemplary embodiment, the present invention provides a method for improved operation of a telecommunications network with a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node, wherein the central office point of delivery and/or the broadband access network comprises a plurality of line termination nodes, wherein a specific line termination node of the plurality of line termination nodes is connectable to at least one specific network termination node of a plurality of network termination nodes, wherein an authentication of the specific network termination node is performed, after connecting the specific network termination node to the specific line termination node, via a provider federation operation, relating the specific network termination node to a specific provider of the communication service providers, wherein the method for improved operation of the telecommunications network and/or service activation and/or operation of the specific network termination node comprises the following steps:

in a first step, the specific network termination node is connected to the specific line termination node and activated, wherein a walled garden access is provided, to the specific network termination node, to access the provider infrastructure control center of the telecommunications network, in a second step, subsequent to the first step, the walled garden access is used, by the specific network termination node or by a client device connected to the specific network termination node, to access a provider-specific server environment of the specific provider, in a third step, subsequent to the second step, the specific network termination node is authenticated and federated with the specific provider.

It is thereby advantageously possible according to the present invention to provide a solution to multi-operator infrastructure sharing, i.e. the infrastructure is shared among multiple operators, wherein a shared server architecture plays an important role to federate service endpoints shared among multiple service providers in a commonly used access network, especially a passive optical network (PON)-based access network. According to the present invention, it is advantageously possible that—in contrast to RADIUS based wholesale—a provider-neutral overlay approach can be realized in order to decouple the infrastructure provider from the service provider.

In conventional PON-based broadband networks, an optical network terminal (ONT), or network termination node, needs to be authenticated by an optical line terminal (OLT), or line termination node. This typically requires hardware information before the optical network terminal (or network termination node) gets connected to the telecommunications network. Conventionally, the operator typically owns the network termination node and provides the credentials which are configured by the operator's technician at time of set up. However, due to regulatory requirements (free choice of network termination nodes (such PON ONTs and/or home gateways), the operator needs to authenticate the unknown network termination node (especially an optical network terminal).

The present invention provides a method of detection for untrusted/unknown ONT devices in order to provide connectivity to a service edge and validating customer connectivity by setting up a centralized server architecture serving wholesale and multi operator environment. This kind of authentication logic supports the principles disclosed in European Patent application 17 175 601.8 and can be regarded as the procedure executed before the registration-ID driven process according to European Patent application 17 175 601.8 can be executed. According to the present invention, a control logic serving multiple providers in a centralized server architecture is used.

It is possible according to the present invention to detect untrusted optical network terminal devices (or network termination nodes) in order to provide connectivity to a service edge in view to validate customer connectivity. Especially, it is advantageously possible according to the present invention to detect unknown optical network terminal devices (or network termination nodes), to correlate the built-in but unknown identity information or hardware ID (especially a serial number or the like or another hardware identity information) with a path setup towards a specific service provider connected to the telecommunications network.

In conventionally known telecommunications networks—especially switching networks that are typically so-called SDN-based (software defined network-based) networks or switching networks (that typically provide the backbone of access PODs (central office points of delivery)—, an SDN (software defined network) controller takes care of the connectivity between different nodes of the central office point of delivery, such as, e.g., leaf and spine switches (or nodes). In conventionally known telecommunications networks, this configuration is typically done by source and destination identifiers (IDs or identity information) which provide (or realize) a mutual assignment between a specific optical network terminal device (or specific network termination node), on the one hand, and a service edge node, on the other hand. From a free choice of the used passive optical network (PON) components or optical network terminals results that the identities (or identity information) of optical network terminal devices (or network termination nodes) are unknown to the network operator and/or to the infrastructure provider.

According to the present invention, a solution is provided for a new multi operator POD Control and Provider Federation VPN (virtual private network) network, a new server farm providing all necessary location look up functions in order to enable flexible PON endpoint provider federation. In SDN-based networks, an SDN controller takes care of provisioning and managing connectivity between the different network nodes, especially leaf and spine switches (especially using source and destination identities or identifiers). In a PON-based access network (with unknown ONT IDs) however, this model cannot be applied straightforwardly as required information for provisioning the path is not available: Either the relation between the ONT identity, on the one hand, to layer 2 circuit identity (or identifier)—which is also known as Line ID—, on the other hand, is missing, or (otherwise) the session correlation in the service edge to the optical network terminal (network termination node) identifier (or identity) cannot be performed. Another problem is the fixed assignment of physical L2 hand off ports towards wholesale partners: This forces an operator to provide a single unchangeable hand off port at service edge (BNG).

Especially, it is advantageously possible according to the present invention to avoid these drawbacks and to provide a flexible fabric setup (within the central office point of delivery) between optical line terminal devices (or line termination nodes) on the one hand, and layer-2 service edge nodes (SE3) on the other hand, is provided.

Hence, according to the present invention, it is advantageously possible that improved operation of a telecommunications network is possible, the telecommunications network being operated as a multi-operator sliced network, and comprising a central office point of delivery and/or a provider infrastructure control center for the service activation and/or operation of a network termination node. A plurality of communication service providers are enabled to use the infrastructure of the telecommunications network for providing communication services to a plurality of users (using network termination nodes). The specific network termination node is authenticated, after connecting the specific network termination node to the specific line termination node, via a provider federation operation, relating the specific network termination node to a specific provider of the communication service providers.

The method comprises the steps of:
in a first step: the specific network termination node is connected to the specific line termination node and activated, wherein a walled garden access is provided, to the specific network termination node, to access the provider infrastructure control center of the telecommunications network,
in a second step, subsequent to the first step: the walled garden access is used, by the specific network termination node or by a client device connected to the specific network termination node, to access a provider-specific server environment of the specific provider,
in a third step, subsequent to the second step: the specific network termination node is authenticated and federated with the specific provider.

The telecommunications network according to the present invention may be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Furthermore, it is advantageously possible and preferred according to the present invention that during the first step, an identity information of the specific network termination node is transmitted to the specific line termination node, the identity information of the specific network termination node especially being a hardware identity information of the specific network termination node, especially a serial number of the specific network termination node.

Via the identity information of the specific network termination node being a hardware identity information of the specific network termination node, especially a serial number of the specific network termination node, it is advantageously possible to easily identify the specific network termination node and/or distinguish different network termination nodes. According to a furthermore preferred embodiment, the identity information of the specific network termination node is a hardware identity information of the specific network termination node such that the identity information is unique, especially universally unique.

Furthermore, and according to an alternative embodiment of the present invention, it is preferred that the provider infrastructure control center comprises a reverse federation proxy entity, the reverse federation proxy entity providing access—using the walled garden access of the specific network termination node or of a client device connected to the specific network termination node—to the provider-specific server environment of the specific provider.

Thereby, it is advantageously possible to provide for efficient realization of the present invention, such that a connection request is able to be routed to the network of the service provider (e.g. a landing page).

According to a further preferred embodiment of the present invention, in order for the specific provider to be able to provide a communication service to the specific network termination node or to the client device connected to the specific network termination node, a specific internet protocol address information is to be associated with the identity information of the specific network termination node, wherein the reverse federation proxy entity transmits the specific internet protocol address information to the specific provider.

Thereby, it is advantageously possible to easily and effectively realize an exemplary embodiment of the inventive method of improved operation of a telecommunications network with a broadband access network, and especially the telecommunications network being operated as a multi-operator sliced network.

According to a further embodiment of the present invention, in order to federate the specific provider with the communication service access provided by the specific network termination node, the specific internet protocol address information is transmitted to the specific line termination node or to the central office point of delivery the specific line termination node is part of or connected to.

Via transmitting the specific internet protocol address information to the specific line termination node or to the central office point of delivery the specific line termination node is part of or connected to, it is advantageously possible to easily and effectively realize an exemplary embodiment of the inventive method of improved operation of a telecommunications network.

According to still a further embodiment of the present invention,—during the second step and while the specific network termination node or the client device connected to the specific network termination node uses the walled garden access to access a provider-specific server environment of the specific provider—customer data and/or a location identification information is provided by the specific network termination node or the client device connected to the specific network termination node.

Via the specific network termination node or the client device connected to the specific network termination node providing customer data and/or or a location identification information, it is advantageously possible to realize an exemplary embodiment of the inventive method efficiently.

According to a further embodiment of the present invention, the provider infrastructure control center comprises a domain name server entity, the domain name server entity referring to the reverse federation proxy entity regarding known hostnames, especially hostnames of provider networks.

Thereby, it is advantageously possible to easily and effectively implement an exemplary embodiment of the inventive method.

According to still a further embodiment of the present invention, the telecommunications network comprises a repository node, the repository node comprising or being able to access relevant pieces of information, especially the corresponding pieces of identity information, regarding all network termination nodes of the plurality of network termination nodes within the broadband access network or within the central office point of delivery.

Thereby, it is advantageously possible to provide for an identification of such optical network terminal devices or network termination nodes that are not under control of the network operator—hence that are in the first place unknown to the network operator.

Furthermore, the present invention relates to a telecommunications network for improved operation, the telecommunications network having a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node, wherein the central office point of delivery and/or the broadband access network comprises a plurality of line termination nodes, wherein a specific line termination node of the plurality of line termination nodes is connectable to at least one specific network termination node of a plurality of network termination nodes, wherein an authentication of the specific network termination node is performed, after connecting the specific network termination node to the specific line termination node, via a provider federation operation, relating the specific network termination node to a specific provider of the communication service providers, wherein the telecommunications network is configured such that:

the specific network termination node is connected to the specific line termination node and activated, wherein a walled garden access is provided, to the specific network termination node, to access the provider infrastructure control center of the telecommunications network, the walled garden access is used, by the specific network termination node or by a client device connected to the specific network termination node, to access a provider-specific server environment of the specific provider, the specific network termination node is authenticated and federated with the specific provider.

Furthermore, the present invention relates to a system for improved operation of a telecommunications network with a broadband access network, the telecommunications network being operated as a multi-operator sliced network, and comprising a central office point of delivery and/or a provider infrastructure control center for the service activation and/or operation of a network termination node, wherein a plurality of communication service providers are enabled to use the infrastructure of the telecommunications network for providing communication services to a plurality of users connected to the telecommunications network using a network termination node, the system comprising the telecommunications network and a specific provider of the communication service providers, wherein the central office point of delivery and/or the broadband access network comprises a plurality of line termination nodes, wherein a specific line termination node of the plurality of line termination nodes is connectable to at least one specific network termination node of a plurality of network termination nodes, wherein an authentication of the specific network termination node is performed, after connecting the specific network termination node to the specific line termination node, via a provider federation operation, relating the specific network termination node to the specific provider, wherein the system is configured to implement a method for improved operation of the telecommunications network and/or service activation and/or operation of the specific network termination node comprising the following steps:

in a first step, the specific network termination node is connected to the specific line termination node and activated, wherein a walled garden access is provided, to the specific network termination node, to access the provider infrastructure control center of the telecommunications network, in a second step, subsequent to the first step, the walled garden access is used, by the specific network termination node or by a client device connected to the specific network termination node, to access a provider-specific server environment of the specific provider, in a third step, subsequent to the second step, the specific network termination node is authenticated and federated with the specific provider.

Additionally, the present invention relates to a provider infrastructure control center of a telecommunications network or of a system and/or use of a provider infrastructure control center in a telecommunications network or in a system or in a method according to the present invention.

Still additionally, the present invention relates to a network of a service provider to be connected to a telecommunications network as a specific service provider or network of a service provider as a specific service provider of a system and/or use of a service provider as a specific service provider in a telecommunications network or in a system or in a method according to the present invention.

Still additionally, the present invention relates to a program comprising a computer readable program code which, when executed on a computer and/or on a central office point of delivery and/or on a provider infrastructure control center, or in part on a central office point of delivery and/or in part on a provider infrastructure control center, causes the computer and/or the central office point of delivery and/or the provider infrastructure control center to perform a method according to the present invention.

Furthermore, the present invention relates to a computer-readable medium comprising instructions which when executed on a computer and/or on a central office point of delivery and/or on a provider infrastructure control center, or in part on a central office point of delivery and/or in part on a provider infrastructure control center, causes the computer and/or the central office point of delivery and/or the provider infrastructure control center to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
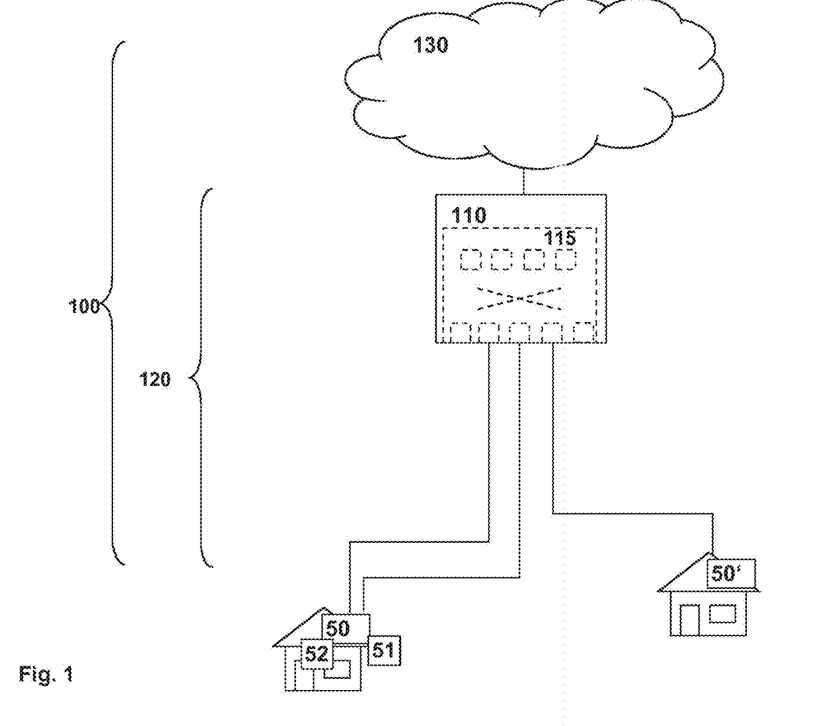
FIG. 1 schematically illustrates a telecommunications network according to an embodiment of the present invention, having a broadband access network with a central office point of delivery.

In FIG. 1, a telecommunications network 100 according to the present invention is schematically shown, having—preferably—at least a fixed line part. A mobile (or cellular) part may be present as well, as part of the telecommunications network 100, but is not specifically illustrated in FIG. 1. User equipments or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built in the client devices 51, 52. Preferably but not necessarily, the central office point of delivery 110 comprises a switching fabric 115 comprising a plurality of spine network nodes and typically also a plurality of leaf network nodes which are not explicitly represented in FIG. 1.

Figure 2:
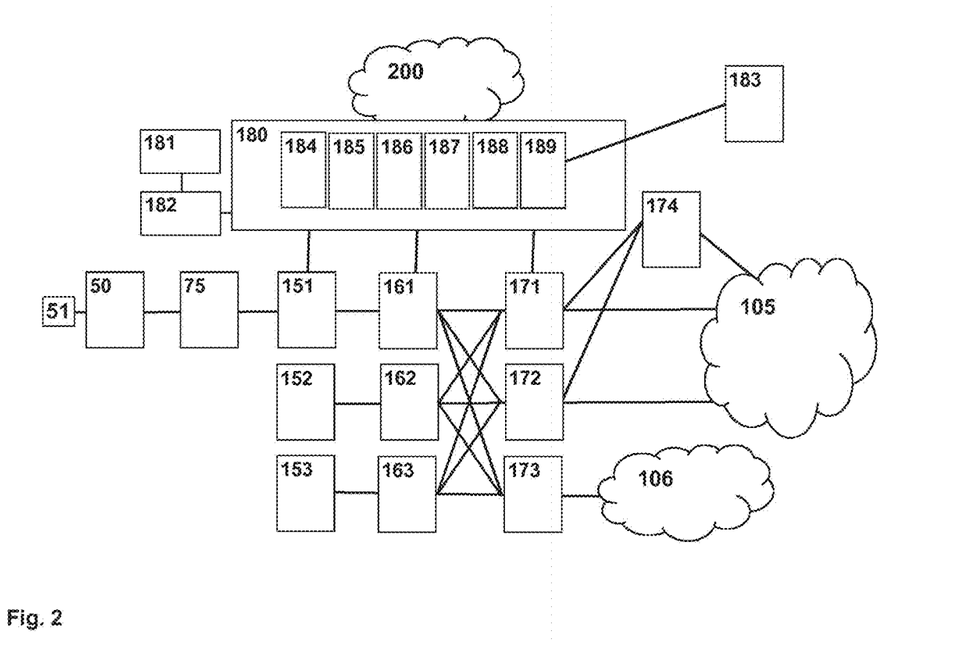
FIG. 2 schematically illustrates a part of a broadband access network of a telecommunications network according to an embodiment of the present invention with a central office point of delivery and a plurality of service edge nodes as well as a provider federation control network.

FIG. 2 schematically illustrates a central office point of delivery 110 as part of a broadband access network 120 of a telecommunications network 100, wherein the represented part of the telecommunications network 100 comprises—besides a controller node 180 and at least one repository node 182—a plurality of line termination nodes 151, 152, 153. Typically, each of the line termination nodes 151, 152, 153 has one or a plurality of access node ports. In the example represented in FIG. 2, the broadband access network 120 comprises three line termination nodes, a first line termination node 151, a second line termination node 152, and a third line termination node 153. The line termination nodes 151, 152, 153 may be provided to support different access technologies to a home gateway or customer premises equipment 50. In the exemplary embodiment shown in FIG. 2, the first line termination node 151 is taken as a line termination node supporting to be connected to an optical network, especially a passive optical network (PON), typically a so-called optical line terminal (OLT) or optical line terminal device. In such a situation, a client device 51 is connected to the telecommunications network 100 (i.e. to the first (or also called specific) line termination node 151) via the customer premises equipment 50 (or home gateway device 50) and a network termination node 75. The functionality of the customer premises equipment 50 (or home gateway device 50) and the functionality of the network termination node 75 may also be integrated in one device or "box". Even the functionality of the client device 51, the functionality of the customer premises equipment 50 (or home gateway device 50) and the functionality of the network termination node 75 may be integrated in one device or "box". Nevertheless, these functionalities are represented in FIG. 2 as separated functionalities. In FIG. 2, only one home gateway device 50 (or customer premises equipment 50) (i.e. a specific customer premises equipment), and only one client device 51, and only one network termination node 75 (i.e. a specific network termination node) are shown. However, also the second and/or third line termination nodes 152, 153 may be connected to corresponding network termination nodes and customer premises equipments.

In the context of the present invention, in order to separate the "specific" or considered entities from the other entities of the same kind within the broadband access network 120, the first line termination node 151 is also called the specific line termination node 151, the network termination node 75 connected to the first line termination node 151 is also called the specific network termination node 75, and the customer premises equipment 50 connected to the specific network termination node 75 is also called the specific customer premises equipment.

In case of the line termination nodes 151, 152, 153 having a plurality of access node ports, also a plurality of network termination nodes are able to be connected to one line termination node 151, 152, 153, and/or in case that a network termination node has a plurality of ports also a plurality of customer premises equipments are able to be connected to one network termination node.

The central office point of delivery 110 and/or the broadband access network 120 comprises a controller node 180, at least one repository node 182, a plurality of line termination nodes 151, 152, 153, and a plurality of service edge nodes 171, 172, 173, 174, wherein a specific line termination node 151 of the plurality of line termination nodes is connectable—using an access node port of the specific line termination node 151- to typically only one specific network termination node 75 (of a plurality of network termination nodes that are, however, not shown in FIG. 2).

Hence, FIG. 2 schematically shows a typical setup of a central office point of delivery 110. The specific customer premises equipment 50 (or specific home gateway 50) is connected via the specific optical network terminal (or the specific network termination node 75) and the specific optical line terminal (OLT MAC) (or the specific line termination node 151) to a leaf switch 161 (of a plurality of leaf switches 161, 162, 163) which is dual-homed at a plurality of spine switches 171, 172, 173. In the exemplary embodiment shown in FIG. 2, it is assumed that the plurality of spine switches 171, 172, 173 also have a functionality of a service edge or a service edge user plane function or functionality (SE U), especially for plain internet access built-in. However, the spine switch functionality may also be separated from the service edge functionality and vice versa, i.e. the service edge function or functionality may as well reside inside a different node in the central office point of delivery (than the spine switch functionality). However, reference signs 171, 172, 173, 174 refer to the service edge functionality, and in case that the service edge functionality is separated from the spine switch functionality (or corresponding nodes are separated), an additional layer of network nodes are present between the leaf switches 161, 162, 163, and the service edge nodes 171, 172, 173, 174. A fourth service edge node 174, used for a bit stream access (BSA-SE-U) is assumed to be the layer-2 handoff for Layer-2 bitstream access which does not require IP routing capabilities. The controller or controller node 180 for the access domain—which controls the central office point of delivery 110—has an access domain repository or repository node 182 (so-called A4 repository) which holds all devices within the passive optical network, including the connected optical network terminal devices (network termination nodes) and/or home gateways 50.

A service edge control plane 188 (or service edge control plane node 188) is shown as residing in the controller node 180, however, according to the present invention, it is also possible that the service edge control plane 188 (or service edge control plane node 188) is located separately from the controller node 180.

Besides the repository node 182, a database for alarms and anomalies is shown. This holds the history even in case of that the A4 repository (or repository node 182) already lost the session context (of a connection session) due to session termination.

At the controller node 180, typically applications or functionalities like an ONT authentication application or functionality 184, and/or a vOLTHA functionality 185 and/or a fabric agent (FN-C) functionality 185 are located that control the configuration and management of related devices.

For communication towards a policy server RP (Radius Proxy), a PFS client or PFS client functionality 189 takes care. A PFS functionality or PFS node 183 corresponds to a platform control which is or corresponds to an AAA (authentication, authorization, and accounting) and Policy Control Server. This platform device receives session initiation requests usually by BNGs which is part of the communication of the central office point of delivery 110. Furthermore, the PFS node 183 is the policy controller providing access profile settings based on policies rules and decisions. This information is sent to central office point of delivery 110 in order to configure at the service edge nodes 171, 172, 173, 174 (SE-U) service related parameters.

As already mentioned, in the typical central office point of delivery setup shown in FIG. 2, a home gateway (HGW) or customer premises equipment 50 is connected via ONT (or network termination node 75) and OLT MAC (or line termination node 151) to a leaf switch 161 which is dual edged at spine 1 (reference sign 171) and spine 2 (reference sign 172). It is assumed that the spine nodes 171, 172 have the SE (service edge) capability for plain internet access. Node 173 (SE 3) is assumed to be the L2 handoff for L2 bitstream access which does not require IP routing capabilities. The controller 180 for the access domain which controls the POD has an access domain repository (A4 repository) 182 which holds all devices within a PON including connected ONTs/HGW. According to the present invention, the description is mainly based on the usage of PPP-based dial in, but the principle is applicable to any kind of dial in (e.g. DHCPv4/v6, SLAAC etc.). Besides the local repository, a database for alarms and anomalies 181 is shown; this holds the history even in case that A4 repository (reference sign 181) already lost session context due to session termination.

According to the present invention, a federation with different service providers is possible, using the POD Control and Provider Federation network or a provider federation control network 200, which solves the problem of global ONT localization and provider federation. Via this architecture, it is possible to solve network wide endpoint authentication in conjunction with multiservice and multi operator functionality. This mechanism is the basic function of a multi operator sliced network on infrastructure level. Conventional 5G technology considers slicing on application level only. According to the present invention, multi provider federation is possible via the control logic serving multiple provider in a centralized server architecture.

Hence, according to the present invention, a method to realize a federation between a specific network termination node 75, on the one hand, and a specific service provider or service provider network, on the other hand, is provided. In order for the central office point of delivery 110 to be able to realize such a federation, the central office point of delivery 110 is connected to the provider federation control network 200.

Figure 3:
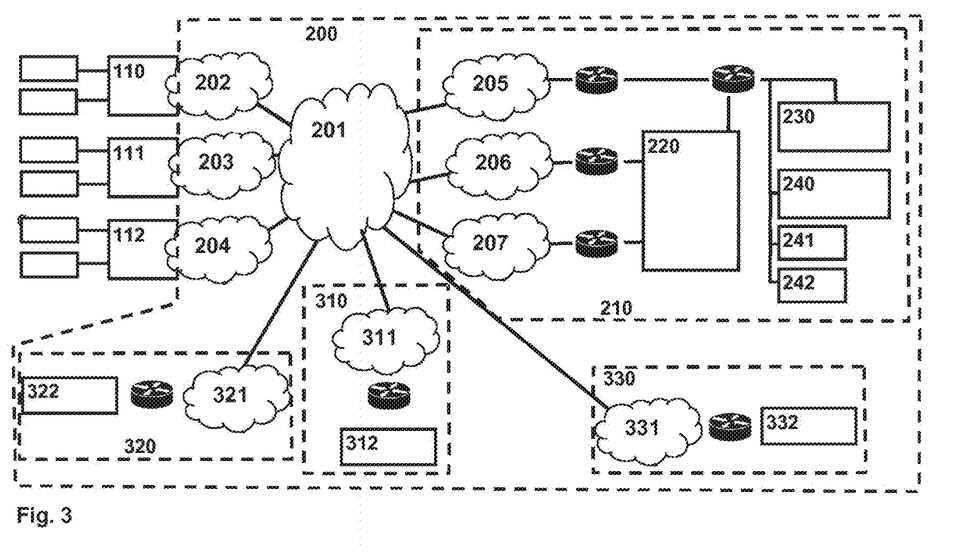
FIG. 3 schematically illustrates the provider federation control network in more detail, the provider federation control network exemplarily comprising the networks for three different providers.

In FIG. 3, the provider federation control network 200 is shown in more detail. The provider federation control network 200 exemplarily comprises the networks of three different service providers 310, 320, 330, namely a first service provider 310, a second service provider 320, and a third service provider 330. The provider federation control network 200 is represented by a dashed line and reference sign 200. The first service provider 310 comprises a first MPLS (multi protocol label switch) VPN (virtual private network) cloud or network 311, and a first registration web server 312. Likewise, the second service provider 320 comprises a second MPLS VPN cloud or network 321, and a second registration web server 322. Likewise, the third service provider 330 comprises a third MPLS VPN cloud or network 331, and a third registration web server 332. The provider federation control network 200 furthermore comprises a reverse federation proxy entity 220, a domain name server entity 230, a data store entity 240, a DHCP (dynamic host configuration protocol) entity 241 (or DHCP server entity 241), and a radius entity 242 (or radius server entity 242), as well as—besides an MPLS backbone 201—a first MPLS VPN 202 of the multi provider federation network, a second MPLS VPN 203 of the multi provider federation network, a third MPLS VPN 204 of the multi provider federation network, a fourth MPLS VPN 205 of the multi provider federation network, and an MPLS VPN 206 of or to the first service provider 310 or the network of the first service provider 310 and an MPLS VPN 207 of or to the third service provider 330 or the network of the third service provider 330. On the left hand side of FIG. 3, the central office point of delivery 110 is schematically shown together with other kinds of access possibilities, such as BNG (broadband network gateway) access 111, and BRAS (broadband remote access server) access 112.

The architecture for Multi Provider Federation includes service edges (e.g. POD, BNG, BRAS) 110, 111, 112 connected via a Multi Provider Federation VPN to a centralized data center which hosts the reverse proxy 220. This reverse proxy 220 is switching requests based on DNS look ups towards service provider dedicated VPNs 311, 321, 331, 206, 207. So each service provider 310, 320, 330 can host its own customers without getting in contact with a landing page provided by the provider who owns the access infrastructure. In wholesale scenarios, subscribers using access lines connected to a POD 110 of operator A will be served by BNGs residing in other operators' networks. To allow for this, there needs to be a network interconnection to those carriers which is—in the exemplary embodiment shown in FIG. 3—usually provided by an IP/MPLS network. The provider federation control network 200 comprises a provider infrastructure control center (PICC) 210 (likewise represented via a dashed line and reference sign 210) that enables the selection of the data path to the right wholesale operator (service provider 310, 320, 330) based on credentials the user has been given by this operator. The provider federation control network 200, and especially the provider infrastructure control center 210, provide the possibility to enable wholesale for broadband access customers connected to the POD 110.

Figure 4:
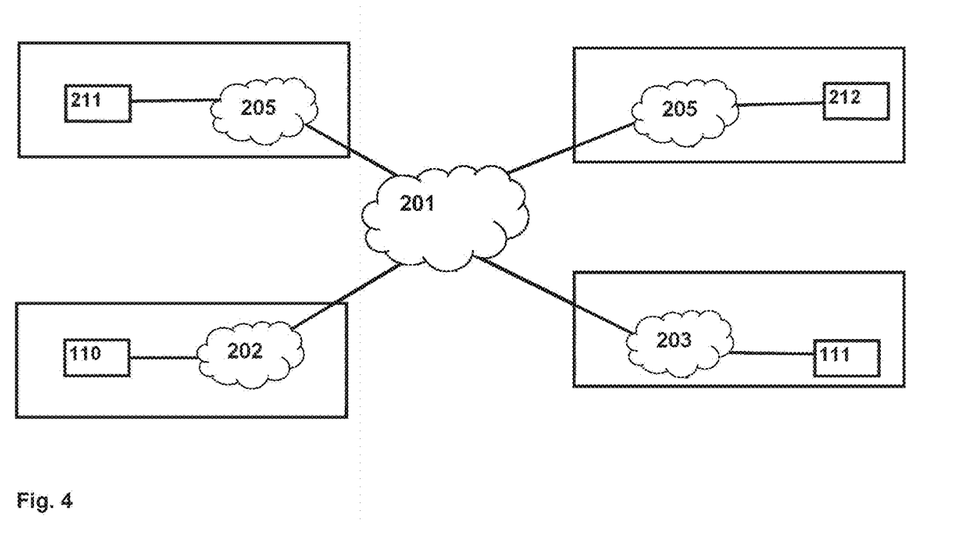
FIG. 4 schematically illustrates another illustration of the multi provider federation network.

In FIG. 4, another illustration of the multi provider federation network 200 is schematically shown, comprising different VPN networks 202, 203, 205, and server farms 211, 212.

Especially, a global MPLS VPN (Hub & Spoke) for virtual routing and forwarding (VRF) POD Multi Provider Federation is provided for all clients, i.e. customers, that are unknown. All central office points of delivery and broadband network gateways are part of the VPN as SPOKE member. In two datacenter clusters, the server farms are realized; these are part of the VPN but as hub members. All server farms publish the same networks (e.g., 10.255.255.0, 16,32/ 28) with different metrics. All server farms are similarly if not identically realized; if one fails, the other is able to take the failed one via a metric. Advantageously, the server farms are completely stateless and do not have any information or status information of from a client. The clients, central office points of delivery 110 and broadband network gateways 111 are able to access the server farm and vice versa; however, clients (or customers), central office points of delivery or broadband network gateways are not able to reach each other. A server farm does no routing and no switching.

Figure 5:
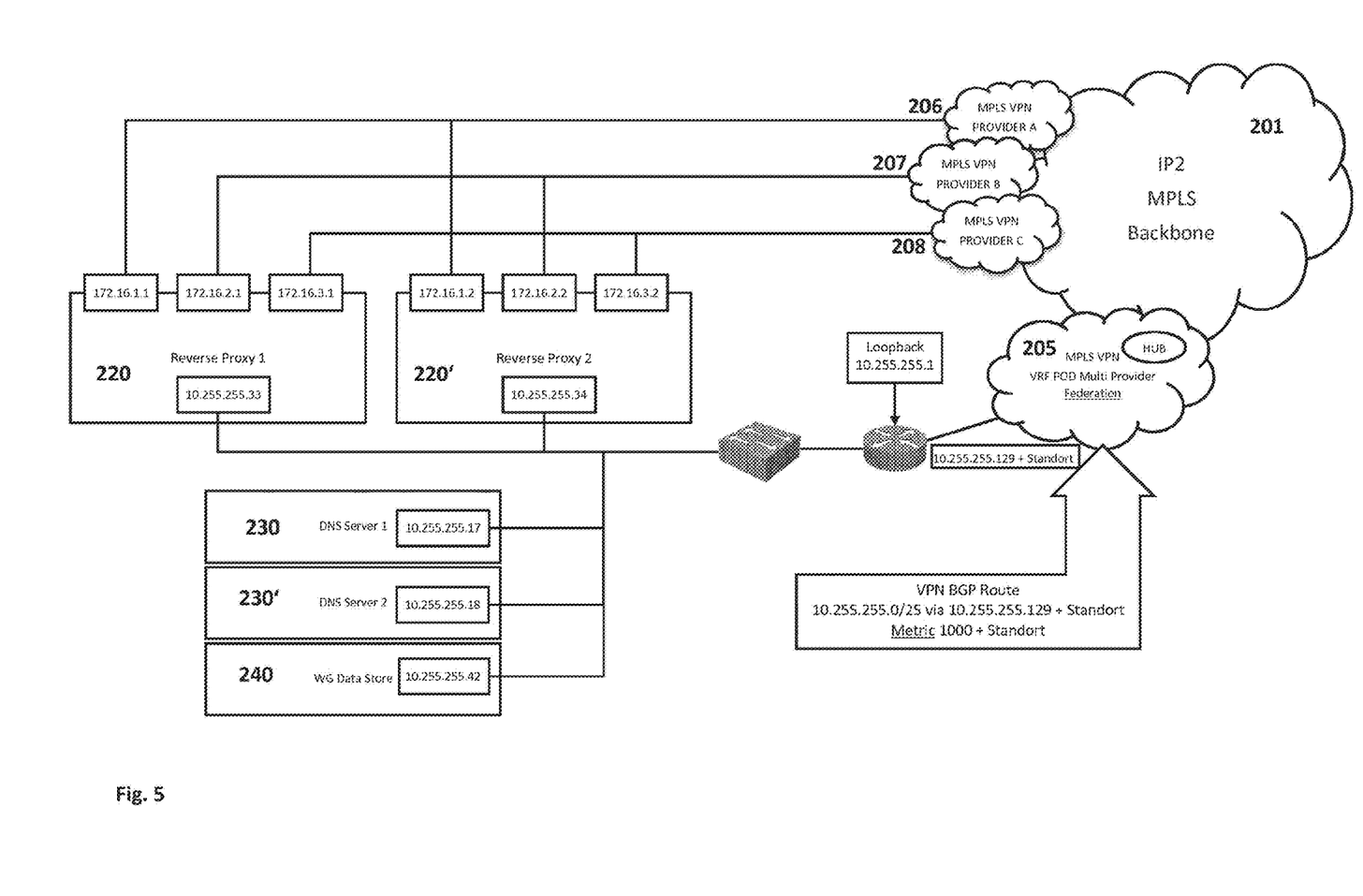
FIG. 5 schematically illustrates details regarding the provider federation control network.

FIG. 5 schematically illustrates details regarding the provider federation control network. The server farm comprises the domain name server entity 230, an auxiliary or redundant domain name server entity 230', the data store entity 240, the reverse federation proxy entity 220, and an auxiliary or redundant reverse federation proxy entity 220'. These configurations are static configurations. The domain name server entity 230 returns (as a consequence or requests regarding known hostnames) basically always the address of the reverse federation proxy entity 220. Unknown hostnames are answered via "NXDOMAIN" or are routed to a catch-all webserver. The default gateway is always 10.255.255.1 and is assigned by the PPA RA. The internet protocol addresses of the domain name server entity 230 are statically defined (or assigned) by the VRF system (virtual routing and forwarding): 10.255.255.17 (for the domain name server entity 230) and 10.255.255.18 (for the auxiliary or redundant domain name server entity 230') and are provided to the client (or to the specific network termination node 75) by the PPA RA. Additionally, the internet protocol addresses of the reverse federation proxy entity 220/220' are also statically defined by the VRF: 10.255.255.33 (for the reverse federation proxy entity 220) and 10.255.255.34 (for the auxiliary or redundant reverse federation proxy entity 220'). The reverse federation proxy entity 220 is a member of the plurality of provider VPN networks 206 (for the first (or specific) service provider 310), 207 (for the second service provider 320), and 208 (for the third service provider 330) as a HUB device. A customer location ID server (CLIS) resolves the access transaction ID (ATI) received from the client (or from the specific network termination node 75 or from a connected device 50, 51 such as a customer premises equipment device or a client device connected thereto) and returns the name of the specific (or used) central office point of delivery 110 via which the correct (specific) central office point of delivery 110 is contacted based on the serial number registration ID to be provided. The customer location ID server (CLIS) may be provided (or constructed or defined) in a hierarchical manner, and comprises all customer location ID information (i.e. the information content of all the customer location IDs) available within the telecommunications network 100.

Figure 6:
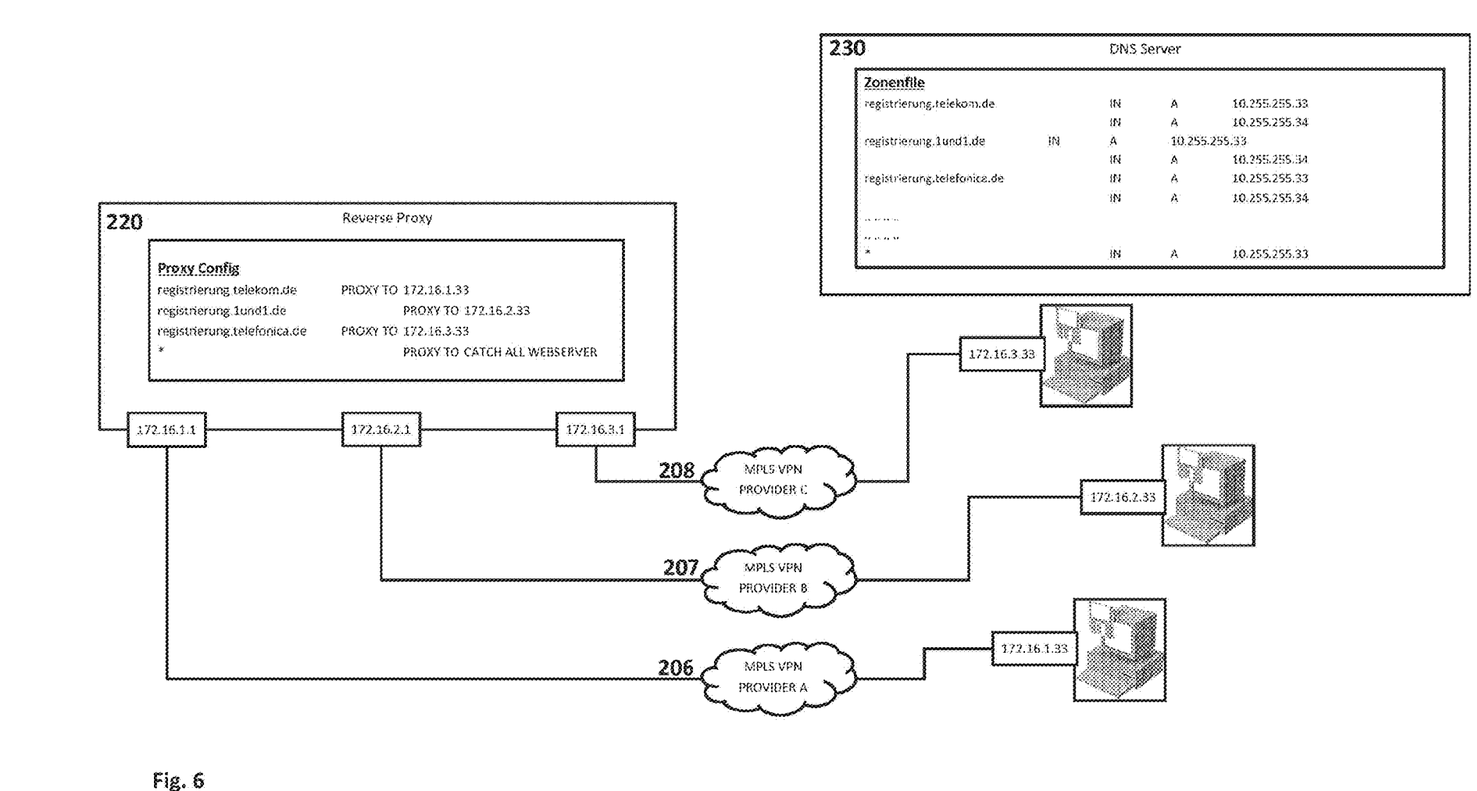
FIG. 6 schematically illustrates details regarding the reverse federation proxy entity.

FIG. 6 schematically illustrates details regarding the reverse proxy server 220. The domain name server entity 230 always returns the internet protocol address of the reverse federation proxy entity 220. The reverse proxy entity 220 does only react to hostnames as part of the uniform resource location information. Especially, the reverse federation proxy entity 220 needs to have server name indication (SNI) capability (HTTPS). The reverse federation proxy entity 220 comprises or acts according to a list (or database) that defines which hostname is routed to which internet protocol address. The reverse federation proxy entity 220 is connected to all service provider VPN networks (represented by reference signs 206, 207, 208 in both FIGS. 5 and 6) as a HUB device. Each service provider 310, 320, 330 needs to implement its own server (or network) infrastructure. Via the MPLS VPN, any service provider is allowed (or is enabled) to redundantly operate a plurality of server infrastructures, especially according to a BGP metric principle. Any service provider is independent from the infrastructure provider's network, and is free to follow own implementation guidelines, provided, however, that the service provider's network is able to be reached by the reverse federation proxy entity 220 (or is capable to cooperate with the reverse federation proxy entity 220). Especially, the service provider 310, 320, 330 is able/allowed to request and obtain data from the data store entity 240 (using the internet protocol address of the reverse federation proxy entity 220) from its own VPN network. In the example shown in FIG. 6, the configuration of the reverse federation proxy entity 220 and of the domain name server entity 230 is provided as follows:

Configuration of the Reverse Federation Proxy Entity 220:

| Proxy Config | |
|---|---|
| registrierung.telekom.de | PROXY TO 172.16.1.33 |
| registrierung.1und1.de | PROXY TO 172.16.2.33 |
| registrierung.telefonica.de | PROXY TO 172.16.3.33 |
| * | PROXY TO CATCH ALL WEBSERVER |

Configuration of the Domain Name Server Entity 230:

| Zonenfile | | | |
|---|---|---|---|
| registrierung.telekom.de | IN | A | 10.255.255.33 |
| | IN | A | 10.255.255.34 |
| registrierung.1und1.de | IN | A | 10.255.255.33 |
| | IN | A | 10.255.255.34 |
| registrierung.telefonica.de | IN | A | 10.255.255.33 |
| | IN | A | 10.255.255.34 |
| ... | | | |
| ... | | | |
| * | IN | A | 10.255.255.33 |

Figure 7:
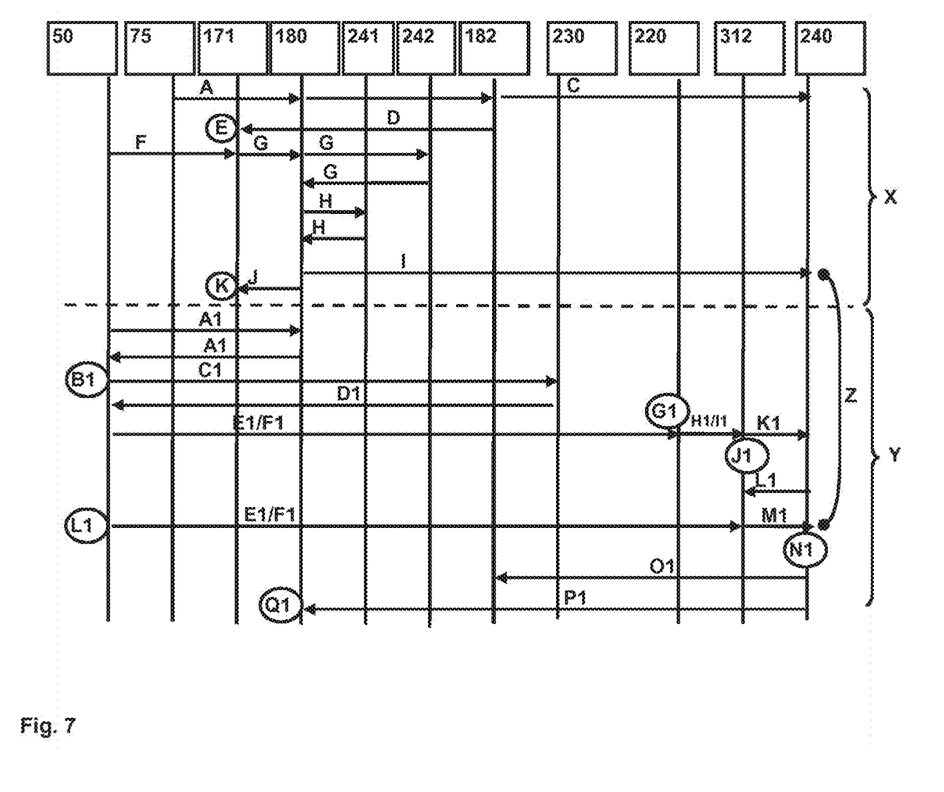
FIG. 7 schematically illustrates a flow diagram relating to a provider federation process.

FIG. 7 schematically illustrates a flow diagram relating to an exemplary embodiment of the inventive provider federation process:

ONT Power Up—Control steps inside the POD

A. the ONT is turned on, and the control system (PPA) receives a port-up message and realizes that it does not know the serial number or registration ID of the device C. The control system (PPA) creates a local database entry for this device and set the "walled garden flag"

D. The control system (PPA) assigns the tunnel that creates for the ONT an outer-VLAN tag from a predefined range (e.g. 3900-4080)

E. The control system (PPA) configures a L2 tunnel to the service edge (SE) inside the POD that is handling such customers F. The customer's home gateway connects to the SE using PPPoE. The credentials are irrelevant G. During the RADIUS authentication from the SE via the control system (PPA). The control system (PPA) detects that this customer had been flagged in the database as "walled garden customer"

H. The control system (PPA) selects a free IP address (e.g. 10.x.x.x) from the walled garden VPN (e.g. VRF WALLED-GARDEN) as well as DNS server (e.g. 10.255.255.17 and 0.18) and Default Gateway (e.g., 10.255.255.1)

I. The control system (PPA) writes all this information including the ONT serial number into a separate database (WG Data Store)

J. control system (PPA) replies to the SE with access-accept and a vendor-specific walled garden flag K. SE connects the customer's L2 tunnel into the walled garden VRF and replies with IP addresses selected Customer Power Up A1. The customer sets up a session via (e.g. PPP, DHCPv4/6, SLAAC . . . )

B1. The customer has received a URL to type into a device connected to the home gateway. example: http://registration.telekom.de. The customer enters this URL into the browser C1. The customer's end device will resolve the DNS name using the assigned servers (here 10.255.255.17 or 0.18)

D1. The DNS server replies with the IP address of the Proxy Server (PS) (here 10.255.255.33 or 0.34)

E1. The browser on the device sets up a TCP connection to one of these servers

F1. The browser issues an HTTP Request: "GET/\r\n Host: registration.telekom.de"

G1. Proxy detects by Hostname "registration.telekom.de" to pass the request towards IP destination 172.16.1.33

H1. Proxy set up through provider VPN (which is unknown for him) a connection towards server with IP 172.16.1.33

I1. Proxy forwards customer IP (given in H to associate registration data later). This can be done e.g. by special Header information.

J1. Server 172.16.1.33 (as example), retrieves customer IP out of I1.

K1. Server 172.16.1.33 gets data out of Central Data Store (e.g. via REST API) and by customer IP also serial number of ONT.

L1. Frontend provides customer ability to insert customer data and location ID (provided by operator and assigned for PON endpoint at time of installation of passive infrastructure.

M1. Server 172.16.1.33 communicates location-ID, Serial number an customer IP to central Data Store N1. Central Data Store checks data and responds in case of correctness with registration ID und Line-ID und all relevant customer data O1. Central Data Store inserts Registration ID and Serial number and all data in POD Data Base and set the flag that autoprovisoning active.

P1. Central Data Store acknowledges and triggers POD controller to release connectivity to VPN Q1. POD Controller triggers fabric in order to redirect customer to regular SE (independent if Retail or Wholesale);

The ONT does not need to be rebooted (big benefit of the invention, that customer is not requested to terminate the PON).

Customer Power Up—after the registration procedure:

I. the optical network terminal (network termination node 75) powers up;

II. the central office point of delivery controller 180 does not have a registration ID but a serial number;

III. the central office point of delivery controller 180 requests and gets a serial number information (in the database of the controller (CDB)) being associated with the information "Autoprovisioning";

IV. the central office point of delivery controller 180 now has a registration ID in the database that the customer should have provided using the optical network terminal (or network termination node) device;

V. the central office point of delivery controller 180 knows the Line ID—based on the knowledge of the registration ID;

VI. the central office point of delivery controller 180 is therefore able to apply the normal process as if the customer had input the registration ID; optionally it is also possible to store this registration ID in the device.

According to an embodiment of the invention:

The Port Up Event of a unknown ONT triggers a request toward POD Control and Provider Federation VPN;

POD Control and Service Provider Federation VPN Reverse (federation) Proxy entity triggers customer request in order resolving provider related server environment Registration server provides the ability to trigger federation to provider and service POD initiates reroute towards regular service edge in order to provide instantiated service According to the present invention, especially a system and a procedure is provided to automatically provision Layer-2 tunnels for subscribers connected to a broadband access infrastructure of an operator A (service provider 310, 320, 330) to a broadband access server of operator B (specific service provider 310) by routing a first request via an intelligent proxy to the respective operator portal server, being enabled to correlate a subscriber-specific information—especially the subscribers IP address—to the serial number of the customer device (i.e. the specific network termination node 75, or the customer premises equipment device 50 or client device 51) by querying the operator A infrastructure server's database allowing to persistently correlate the customer information to create a persistent mapping to the target operator B (i.e. the specific service provider 310). Possible methods or protocols include: the use of a PIC, the use of PPP or of IpoE, the use of IPv4 and IPv6, or the use of any kind of VPN. It is also contemplated to enable a plurality of such methods or protocols: In this case, the controller assigns them according a distribution rule which is either load dependent or operator pre-configured.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a telecommunications network with a broadband access network, the telecommunications network being operated as a multi-operator sliced network and comprising at least one of a central office point of delivery or a provider infrastructure control center for at least one of service activation or operation of a network termination node,
    wherein a plurality of communication service providers are enabled to use infrastructure of the telecommunications network for providing communication services to a plurality of users connected to the telecommunications network using a network termination node,
    wherein at least one of the central office point of delivery or the broadband access network comprises a plurality of line termination nodes, wherein a specific line termination node of the plurality of line termination nodes is connectable to a specific network termination node of a plurality of network termination nodes,
    wherein an authentication of the specific network termination node is performed, after connecting the specific network termination node to the specific line termination node, via a provider federation operation, relating the specific network termination node to a specific provider of the communication service providers,
    wherein the method comprises:
    in a first step, the specific network termination node is connected to the specific line termination node and activated, wherein a walled garden access is provided, to the specific network termination node, to access the provider infrastructure control center of the telecommunications network;
    in a second step, subsequent to the first step, the walled garden access is used, by the specific network termination node or by a client device connected to the specific network termination node, to access a provider-specific server environment of the specific provider; and
    in a third step, subsequent to the second step, the specific network termination node is authenticated and federated with the specific provider.

2. The method according to claim 1, wherein during the first step, identity information of the specific network termination node is transmitted to the specific line termination node, wherein the identity information of the specific network termination node is a serial number of the specific network termination node.

3. The method according to claim 1, wherein the provider infrastructure control center comprises a reverse federation proxy entity, the reverse federation proxy entity providing access using the walled garden access of the specific network termination node or of the client device connected to the specific network termination node to the provider-specific server environment of the specific provider.

4. The method according to claim 3, wherein in order for the specific provider to be able to provide a communication service to the specific network termination node or to the client device connected to the specific network termination node, specific internet protocol address information is to be associated with the identity information of the specific network termination node, wherein the reverse federation proxy entity transmits the specific internet protocol address information to the specific provider.

5. The method according to claim 4, wherein in order to federate the specific provider with the communication service access provided by the specific network termination node, the specific internet protocol address information is transmitted to the specific line termination node or to the central office point of delivery the specific line termination node is part of or connected to.

6. The method according to claim 1, wherein—during the second step and while the specific network termination node or the client device connected to the specific network termination node uses the walled garden access to access the provider-specific server environment of the specific provider—at least one of customer data or location identification information is provided by the specific network termination node or the client device connected to the specific network termination node.

7. The method according to claim 1, wherein the provider infrastructure control center comprises a domain name server entity, the domain name server entity referring to a reverse federation proxy entity regarding known hostnames.

8. The method according to claim 1, wherein the telecommunications network comprises a repository node, the repository node comprising or being able to access identity information regarding all network termination nodes of the plurality of network termination nodes within the broadband access network or within the central office point of delivery.

9. A telecommunications system for operation of a telecommunications network with a broadband access network, the telecommunications network being operated as a multi-operator sliced network, wherein the telecommunications system comprises:
 a telecommunications network comprising at least one of a central office point of delivery or a provider infrastructure control center for at least one of service activation or operation of a network termination node, wherein a plurality of communication service providers are enabled to use infrastructure of the telecommunications network for providing communication services to a plurality of users connected to the telecommunications network using a network termination node; and
 a specific provider of the communication service providers;
 wherein at least one of the central office point of delivery or the broadband access network comprises a plurality of line termination nodes, wherein a specific line termination node of the plurality of line termination nodes is connectable to a specific network termination node of a plurality of network termination nodes;
 wherein the telecommunications network is configured to perform an authentication of the specific network termination node, after connecting the specific network termination node to the specific line termination node, via a provider federation operation, relating the specific network termination node to the specific provider;
 wherein the telecommunications network and the specific provider are configured to implement the following steps:
 in a first step, the specific network termination node is connected to the specific line termination node and activated, wherein a walled garden access is provided, to the specific network termination node, to access the provider infrastructure control center of the telecommunications network;
 in a second step, subsequent to the first step, the walled garden access is used, by the specific network termination node or by a client device connected to the specific network termination node, to access a provider-specific server environment of the specific provider; and
 in a third step, subsequent to the second step, the specific network termination node is authenticated and federated with the specific provider.

10. A non-transitory computer-readable medium having processor-executable instructions stored thereon for operation of a telecommunications network with a broadband access network, the telecommunications network being operated as a multi-operator sliced network and comprising at least one of a central office point of delivery or a provider infrastructure control center for at least one of service activation or operation of a network termination node,
 wherein a plurality of communication service providers are enabled to use infrastructure of the telecommunications network for providing communication services to a plurality of users connected to the telecommunications network using a network termination node,
 wherein at least one of the central office point of delivery or the broadband access network comprises a plurality of line termination nodes, wherein a specific line termination node of the plurality of line termination nodes is connectable to a specific network termination node of a plurality of network termination nodes,
 wherein the processor-executable instructions, when executed, facilitate: an authentication of the specific network termination node being performed, after connecting the specific network termination node to the specific line termination node, via a provider federation operation, relating the specific network termination node to a specific provider of the communication service providers,
 wherein the processor-executable instructions, when executed, further facilitate:
 in a first step, the specific network termination node is connected to the specific line termination node and activated, wherein a walled garden access is provided, to the specific network termination node, to access the provider infrastructure control center of the telecommunications network;
 in a second step, subsequent to the first step, the walled garden access is used, by the specific network termination node or by a client device connected to the specific network termination node, to access a provider-specific server environment of the specific provider; and
 in a third step, subsequent to the second step, the specific network termination node is authenticated and federated with the specific provider.

* * * * *